(12) United States Patent
Kuroda (10) Patent No.: US 7,329,010 B2
(45) Date of Patent: Feb. 12, 2008

(54) REAR PROJECTION APPARATUS

(75) Inventor: Yasuto Kuroda, Saitama (JP)

(73) Assignee: Fujinon Corporation, Saitama (JP)

( * ) Notice: Subject to any disclaimer, the term of this patent is extended or adjusted under 35 U.S.C. 154(b) by 235 days.

(21) Appl. No.: 11/048,750

(22) Filed: Feb. 3, 2005

(65) Prior Publication Data

US 2005/0174546 A1 Aug. 11, 2005

(30) Foreign Application Priority Data

Feb. 10, 2004 (JP) .............................. 2004-034036

(51) Int. Cl.
*G03B 21/20* (2006.01)
*H04N 5/64* (2006.01)

(52) U.S. Cl. .................... 353/87; 353/119; 348/794

(58) Field of Classification Search ............... 353/31, 353/69, 70, 72, 74, 77, 78, 79, 85, 87, 119, 353/75; 359/649, 703; 348/793, 787, 788, 348/789, 794; 312/10.1; 349/58; 321/20; *G03B 21/20*
See application file for complete search history.

(56) References Cited

U.S. PATENT DOCUMENTS

| 5,833,341 | A  | * | 11/1998 | Kimura et al. ............... 353/98 |
| 6,224,216 | B1 | * | 5/2001  | Parker et al. ............... 353/31 |
| 6,467,911 | B1 | * | 10/2002 | Ueyama et al. ............... 353/87 |
| 6,508,556 | B1 | * | 1/2003  | Ueda ............................ 353/74 |
| 6,547,423 | B2 | * | 4/2003  | Marshall et al. ............. 362/333 |
| 6,594,089 | B2 | * | 7/2003  | Tanabe et al. ............... 359/703 |
| 6,712,486 | B1 | * | 3/2004  | Popovich et al. ............ 362/249 |
| 6,834,963 | B2 | * | 12/2004 | Kim et al. .................... 353/31 |
| 6,969,180 | B2 | * | 11/2005 | Waters ........................ 362/293 |
| 7,048,389 | B2 | * | 5/2006  | Lee ............................. 353/101 |
| 7,059,746 | B2 | * | 6/2006  | Takezawa .................... 362/252 |
| 7,088,321 | B1 | * | 8/2006  | Parker ......................... 345/83 |
| 2004/0263790 | A1 | * | 12/2004 | VanOverloop et al. ........ 353/31 |

FOREIGN PATENT DOCUMENTS

JP 2000-112026 4/2000
JP 2001-264878 9/2001

* cited by examiner

*Primary Examiner*—Andrew T Sever
(74) *Attorney, Agent, or Firm*—Arnold International; Bruce Y. Arnold (57) ABSTRACT

A housing is mounted with a screen. The housing accommodates a projector unit and a mirror. Image light emitted from the projector unit is projected to the rear of a translucent screen via the mirror. The projector unit includes a unit body, which accommodates liquid crystal display (LCD) panels and a projection lens, and a lamp housing in which a lamp unit is removably set. The lamp housing is rotatably attached to the unit body in a direction parallel to the screen and perpendicular to the unit body. The lamp housing is fixed to the unit body in a state that the lamp unit is set in a predetermined posture. The lamp unit is set in the lamp housing via a lamp opening of the housing.

6 Claims, 6 Drawing Sheets

REAR PROJECTION APPARATUS

BACKGROUND OF THE INVENTION

1. Field of the Invention

The present invention relates to a rear projection apparatus which facilitates replacement of a lamp.

2. Description of the Related Art

Projectors modulate illumination light by an image display panel with respect to each pixel, and display images on a large-screen by magnifying and projecting image light which carries image information. There are a front type projector, which projects the images from the front of a screen, and a rear type projector, which projects the images from behind the screen.

In recent years, a rear projection apparatus, which utilizes a rear projector as a large-screen television, receives attention. The rear projection apparatus has a translucent screen incorporated in a housing, and accommodates a plane mirror, which is installed in the housing, and a projector unit for projecting the image light to the plane mirror. The interior of the housing of the rear projection apparatus is hollow, so that it is possible, for instance, to use the same projector unit for the rear projection apparatus with different screen size by adjusting a projection distance by changing the arrangement of the projector unit.

Since the projector unit of the rear projection apparatus is continuously used for a long time, a life of a lamp, which illuminates the image display panel, expires in a relatively short term. Therefore, it is preferable that a user can replace the lamp without asking a lamp replacement service. For that reason, it is desirable, for instance, to constitute the lamp as a unit, which enables the user to replace the lamp only by taking out and inserting the lamp to the housing like a cartridge. There is a conventional rear projection apparatus provided with two lamps, so when a life of one lamp is expired, the other lamp is used as a spare lamp to avoid replacement of the expired lamp at a high temperature, and it also prevents interruption of image projection while replacing the lamp (Japanese Patent Laid-Open Publication No. 2000-112026 and No. 2001-264878).

As for the rear projection apparatus of the present invention, the same projector unit can be used for the rear projection apparatuses with the different screen size. However, there are cases where it becomes necessary to change a direction of the image light projection of the projector unit according to inclination of the plane mirror or a projection distance. For that reason, in prior art disclosed in the above references, a posture for setting the projector unit must be changed according to the screen size of the rear projection apparatus. A change in the posture of the lamp makes it hard to take out the lamp, so that there arises a problem that the replacement of the lamp becomes difficult.

SUMMARY OF THE INVENTION

In view of the foregoing, an object of the present invention is to provide a rear projection apparatus which facilitates replacement of a lamp by keeping a direction of taking out the lamp constant regardless of changes in a direction of image-light projection of a projector unit.

In order to achieve the above and other objects, the rear projection apparatus according to the present invention provides a connection mechanism which rotatably connects a lamp housing and a unit body in a direction parallel to a screen and perpendicular to a direction of image light emitted from the unit body. The unit body and the lamp housing constitute a projector unit. The unit body accommodates an image display panel which converts illumination light of the lamp to the image light, and the image light emitted from the unit body is projected from behind the screen via a reflection member. The lamp unit holds the lamp, and is set in the lamp housing in such away that the lamp unit can be taken out in a direction perpendicular to the lamp housing. The connection mechanism fixes the lamp housing to the unit body in a state that the lamp unit keeps a predetermined posture.

The screen is mounted to the housing, and the housing accommodates the projector unit and the reflection member. The housing is formed with an opening for taking out or inserting the lamp unit. The opening is closed with a lid.

According to a preferred embodiment of the present invention, the connection mechanism includes a first flange provided in the unit body, at least one arc-shaped first slit formed in the first flange, a second flange provided in the lamp housing, at least one arc-shaped second slit formed in the second flange, and a connection member which is inserted through the first slit and the second slit to connect the first flange and second flange. When the lamp unit is accommodated in the lamp housing, the lamp may be energized with electricity supplied from the lamp housing. The lamp unit is provided with a handle.

According to the present invention, the lamp is rotated around a center of the direction of the illumination light with respect to the projector unit. Therefore, it becomes possible to rotate and afix the lamp without changing a position of the opening for taking out the lamp or a direction of taking out the lamp regardless of changes in the angle of the image-light projection of the unit body. Accordingly, convenience of replacing the lamp is not impaired.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
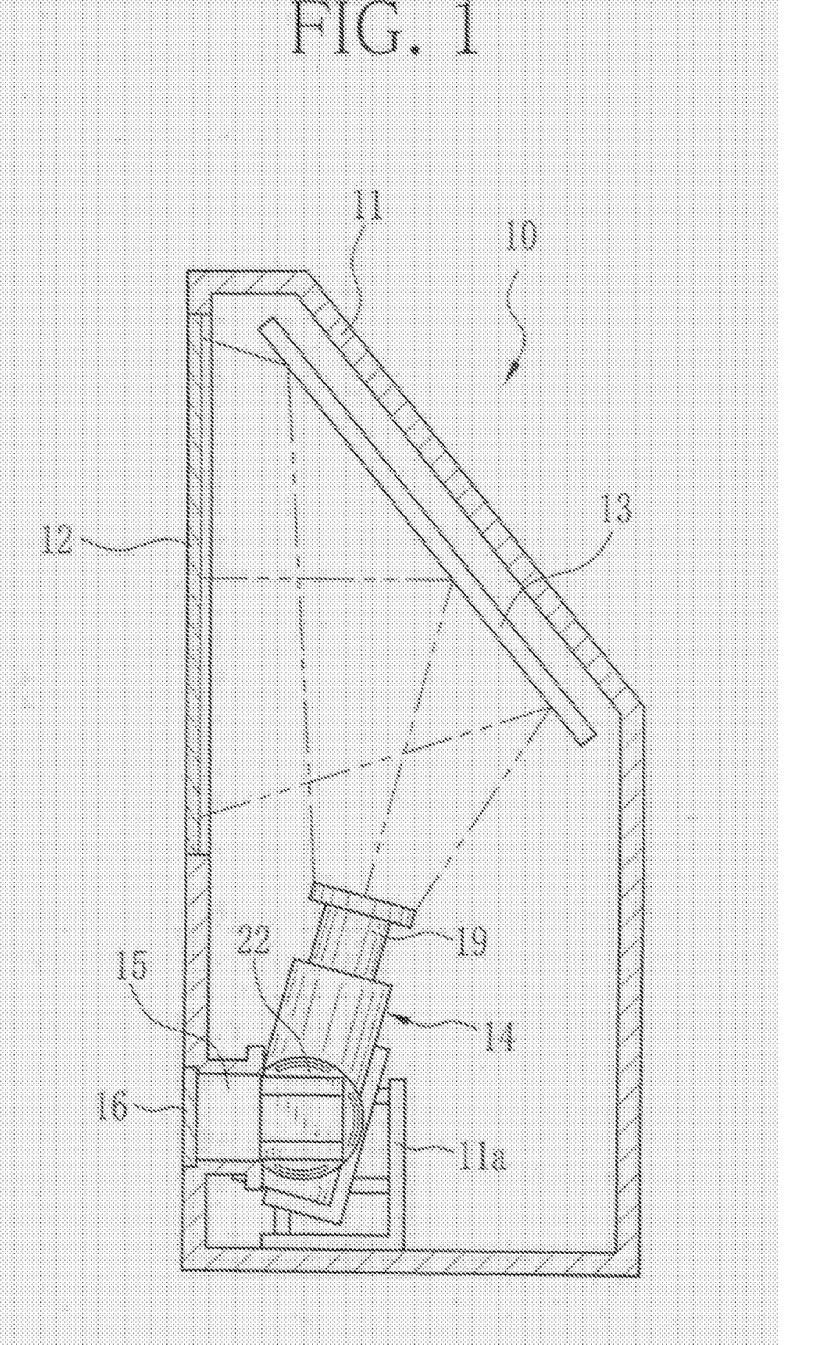
FIG. 1 is a section view of a rear projection apparatus.

In FIG. 1, a rear projection apparatus 10 includes a housing 11, which has an approximate trapezoidal cross-section, and a translucent screen 12, which is provided on the front of the housing 11. Inside the housing 11, a plane mirror 13, and a projector unit 14 are accommodated. The projector unit 14 is incorporated in a lower portion of the housing 11 in a state that the projector unit 14 is fixed to a support 11a, and projects image light according to externally input image signals. The plane mirror 13 is tilted and placed behind the screen 12, and reflects the image light, which is projected from the projector unit 14, toward the screen 12. An image formed on the screen 12 is observed from the front side of the screen. By the use of the plane mirror 13, a proper projection distance is secured according to a size of the screen 12 without changing a size of the housing 11. Therefore, the depth dimensions of the housing 11 are reduced when compared to the case where the projector unit 14 is placed behind the screen 12.

The housing 11 has a lamp opening 15 for taking out the lamp below the screen 12. The lamp opening 15 is used when replacing the lamp of the projector unit 14. The lamp opening 15 has a door 16. The door 16 is opened when replacing the lamp, and is closed otherwise.

Figure 2:
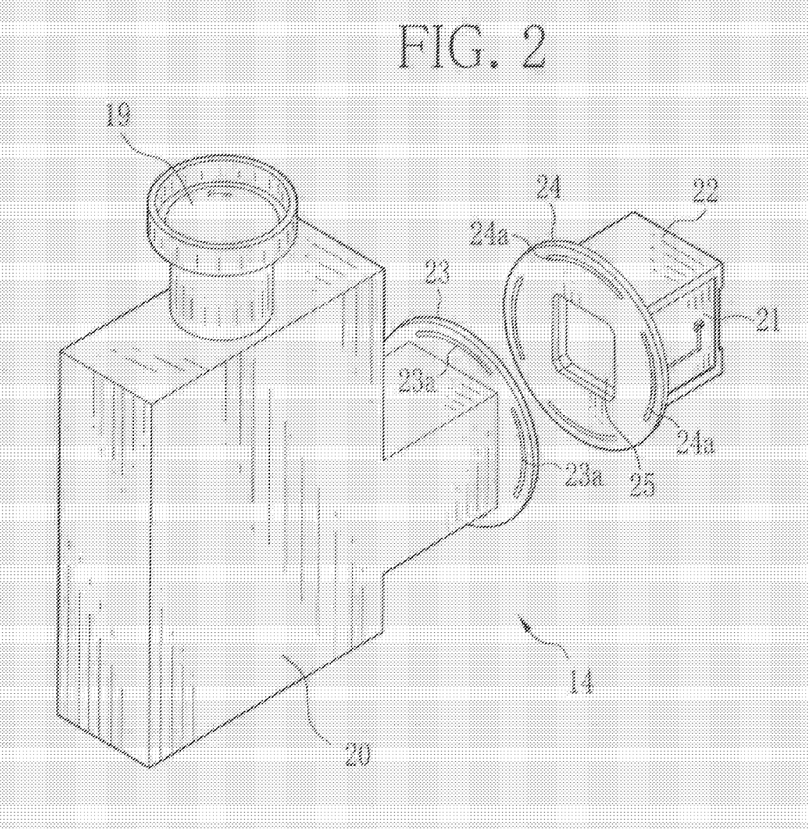
FIG. 2 is a perspective view of a projector unit.

In FIG. 2, the projector unit 14 includes a unit body 20, in which a projection lens 19 is mounted, and a lamp housing 22 which accommodates a lamp unit 21. The unit body 20 is supported by the support 11a. The unit body 20 and the lamp housing 22 have circular flanges 23 and 24 respectively. The flanges 23 and 24 are formed with four arc-shaped circular slits 23a and 24a respectively. Connection members such as a pin 26 (see FIG. 6A), bolts and nuts, are inserted in the circular slits 23a and 24a, and the unit body 20 and the lamp housing 22 are connected by connecting the flanges 23 and 24. A center of each arc of the circular slits 23a and 24a corresponds to that of an illumination opening 25 that is formed in each of the flanges 23 and 24. The unit body 20 is connected to the lamp housing 22 such the unit body 20 is allowed to rotate a one-forth turn around the center of the illumination opening 25 with respect to the lamp housing 22.

Figure 3:
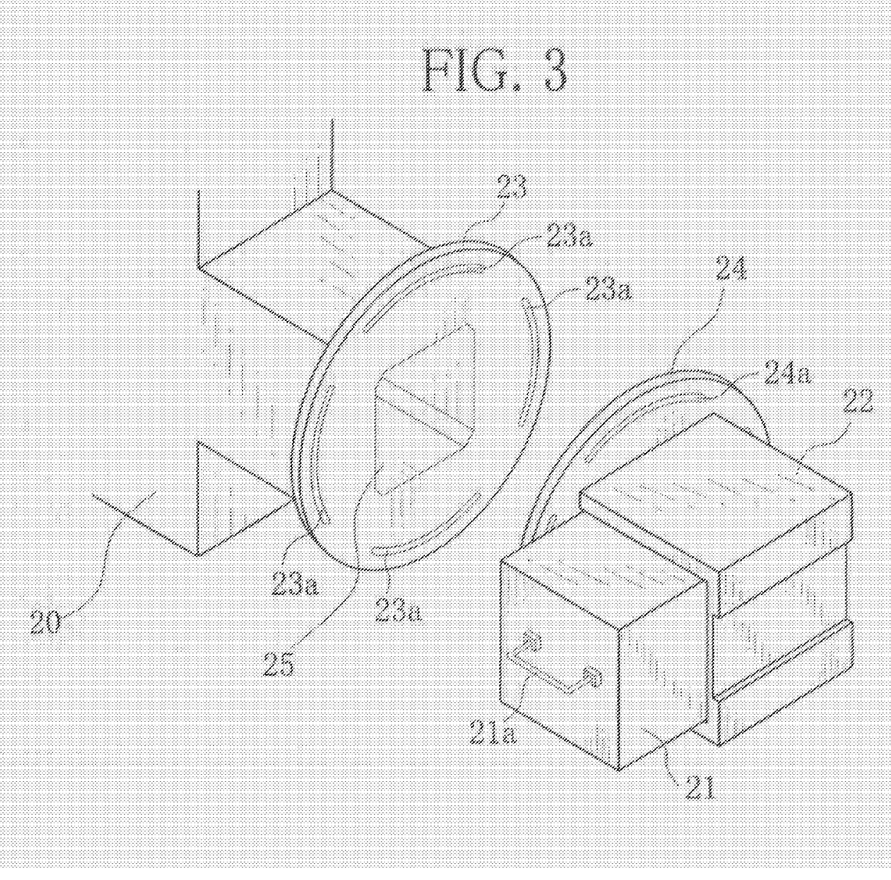
FIG. 3 is a perspective view of a lamp housing.

In FIG. 3, the lamp unit 21 incorporates a lamp 33 (not shown in FIG. 3, but shown in FIG. 4), and the lamp unit 21 is used as a basic unit for attaching or removing the lamp 33 from the lamp housing 22. The lamp unit 21 has a handle 21a on a lateral wall perpendicular to a wall having the illumination opening 25, and is taken out from the lamp opening 15 in a direction perpendicular to the optical axis of the illumination light via the door 16. Further, the lamp unit 21 has a contact (not shown) for electrically connecting the lamp unit 21 and the lamp housing 22. By accommodating the lamp unit 21 in the lamp housing 22, the lamp 33 is connected to a power source.

Figure 4:
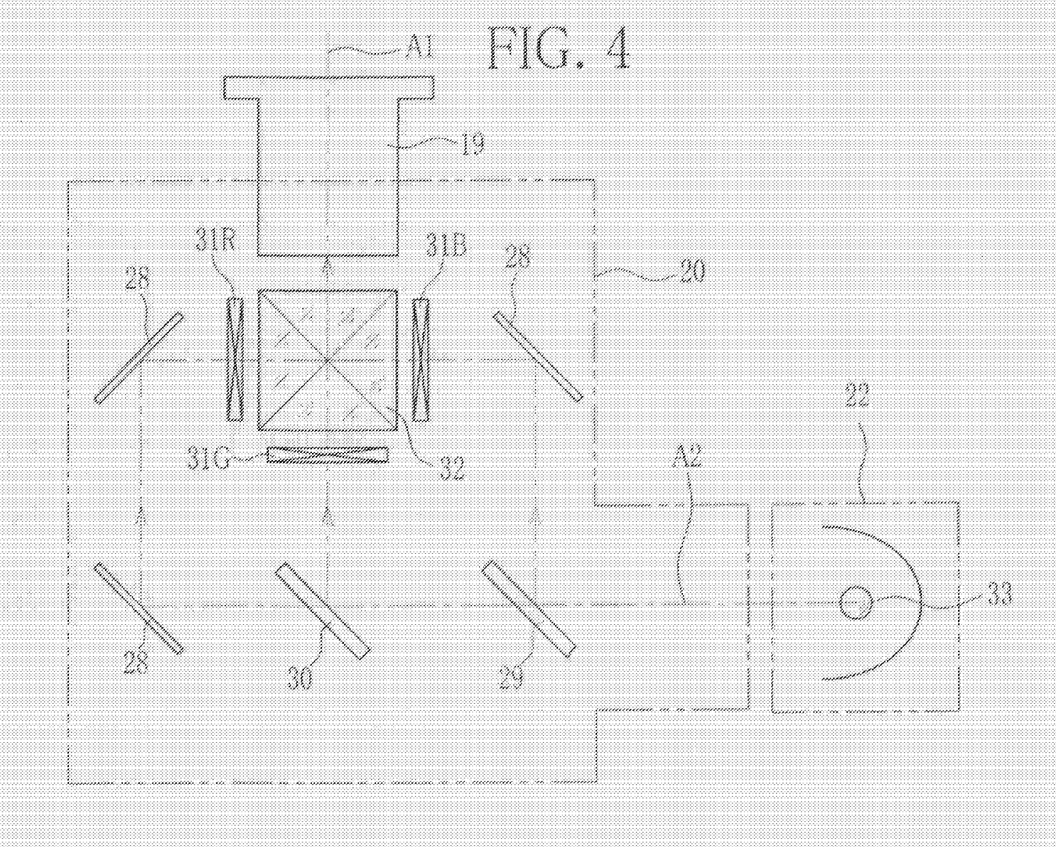
FIG. 4 is an outlined diagram of the projector unit.

In FIG. 4, the unit body 20 has total reflection mirrors 28, dichroic mirrors 29 and 30, three translucent liquid crystal display (LCD) panels 31R, 31G and 31B, and a cross dichroic prism 32. As for the lamp 33, a high-intensity light source, such as an ultra high-pressure mercury lamp or a metal halide lamp, is used. White light emitted from the lamp 33 is converted to a light ray with uniform illuminance via illumination optical system (not shown) and enters the dichroic mirror 29.

The dichroic mirror 29 reflects blue light and separates the blue light from the white light by passing red light and green light through the dichroic mirror 29. The separated blue light enters the LCD panel 31B. The red light and the green light, which have passed through the dichroic mirror 29, enter the dichroic mirror 30. The dichroic mirror 30 passes the red light through it and reflects the green light, so that the red light and the green light are separated. The red light and the green light enter the LCD panels 31R and 31G respectively.

As the red light, green light and blue light, enter the LCD panels 31R, 31G and 31B, respectively, image information is attached to each light by passing through each LCD panel. Each light ray, which passes through corresponding LCD panel, enters the cross dichroic prism 32. In the cross dichroic prism 32, the light rays of three colors, to which the image information is attached, is composited. Composite light enters the projection lens 19. The projection lens 19 magnifies and projects the incident composite light, and forms a color image on the screen 12 (not shown). An optical axis A1 of the projection lens 19 is perpendicular to a center of a direction of illumination light emitted from the lamp 33, that is, an optical axis A2 of the illumination optical system.

Figure 5:
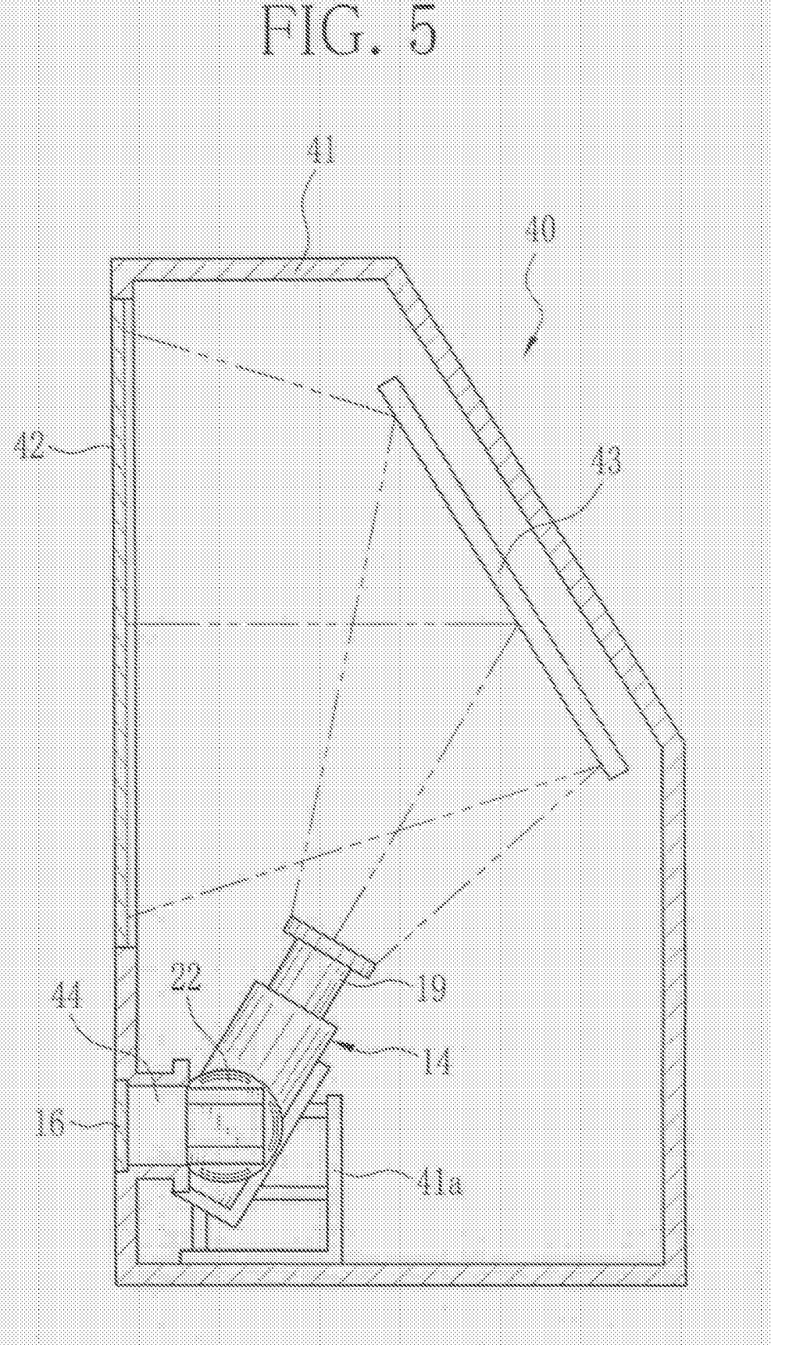
FIG. 5 is a section view of the rear projection apparatus of another embodiment.

A rear projection apparatus 40 shown in FIG. 5 has the same projector unit 14 as that of the rear projection apparatus 10. A housing 41 has a larger thickness compared to the housing 11. Further, a screen 42 provided on the front of the housing 41 has larger diagonal dimensions compared to the screen 12. The projector unit 14 is fixed to a support 41a. A plane mirror 43 is provided behind the screen 42. Further, a lamp opening 44 for taking out the lamp is provided below the screen 42, so that the lamp unit 21 can be taken out in a horizontal direction in the same way as the rear projection apparatus 10.

The lamp housing 22 is respectively disposed in the projector unit 14 (see FIG. 6A) of the rear projection apparatus 10 and the projector unit 14 (see FIG. 6B) of the rear projection apparatus 40, in such a way that each lamp unit 21 can be taken out in the same horizontal direction. When an angle, which is between the optical axis A1 of the projection lens 19 and the horizontal direction, of the rear projection apparatus 10 is determined as $\alpha$, and that of the rear projection apparatus 40 is determined as $\beta$, $\alpha$ and $\beta$ satisfies $\alpha > \beta$.

Figure 6A:
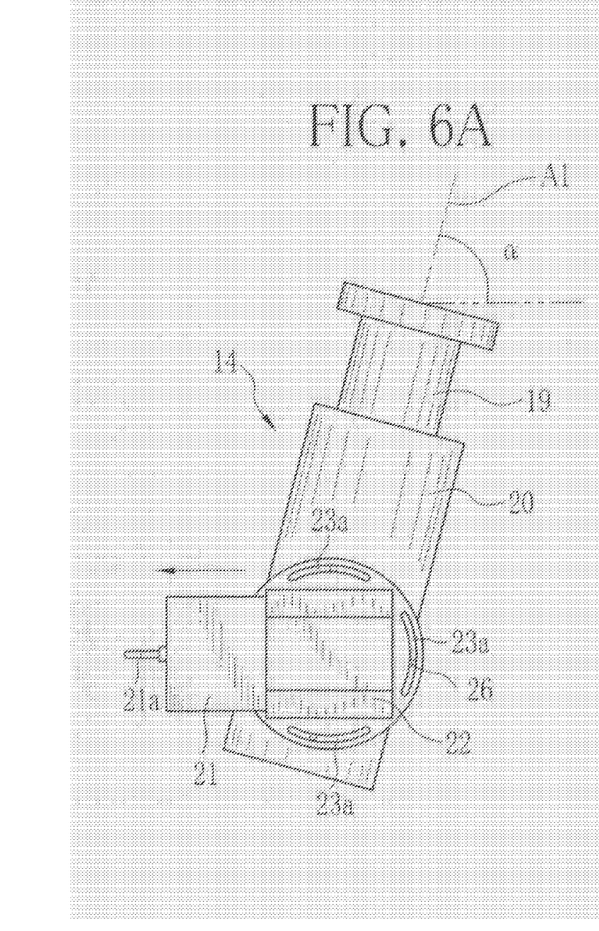
FIGS. 6A and 6B are explanatory views showing different projection angles of respective unit bodies.
Figure 6B:
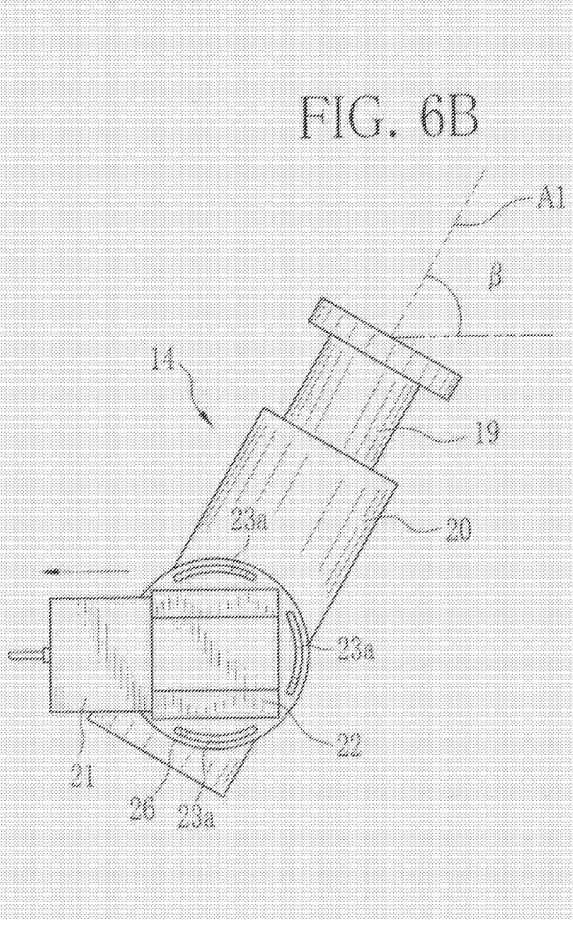

The rear projection apparatuses 10 and 40 differ in a direction of the optical axis A1 of the projection lens 19 with respect to the lamp housing 22, that is, a posture of the unit body 20. The unit body 20 is disposed in a proper posture according to different specifications of, for instance, a screen size. Further, the lamp openings 15 and 44 are provided on the front of the housings 11 and 41 respectively in order to facilitate replacement of the lamp. Each lamp housing 22 of the rear projection apparatuses 10 and 40 are rotated around the center of the direction of the illumination light via the flanges 23 and 24 with respect to the unit body 20, and fixed in a posture where each lamp unit 21 is to be taken out in the same direction. Therefore, there is no such case where the lamp unit 21 is to be taken out obliquely from above or below when using the rear projection apparatuses 10 and 40. Consequently, the rear projection apparatuses of the present invention do not make the replacement of the lamp difficult.

In the above embodiment, a three-plate projector with three translucent LCD panels 31R-31B is described. However, it is also possible to apply the present invention to a rear projection apparatus provided with other image display device, such as a reflective LCD panel or a digital micro mirror device. Further, forms of the rotatable connection mechanism can be properly changed besides using a flange with the arc-shaped circular slits, which is attached to the unit body 20 and the lamp housing 22 respectively. It is also possible to dispose a plurality of plane mirrors in a zigzag pattern to considerably extend the projection distance.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A rear projection apparatus for projecting image light from behind a screen, said rear projection apparatus comprising:
  (A) a projector unit for emitting said image light, said projector unit comprising:
    (a) at least one image display panel, said image display panel convening illumination light to said image light;
    (b) a unit body for accommodating said image display panel;
    (c) a lamp for emitting said illumination light;

(d) a lamp unit for accommodating said lamp, said lamp unit having an optical axis;

(e) a lamp housing for removably holding said lamp unit;

(f) a connection mechanism for connecting said lamp housing to said unit body in a direction parallel to said screen and perpendicular to an optical axis of image light emitted from said projector unit, said connection mechanism fixing said lamp housing to said unit body in a state that maintains a predetermined posture of said lamp unit, other than in rotation about the optical axis of the lamp unit, relative to the projector unit as said unit body is rotated to different projection angles from the horizontal direction so as to accommodate different screen sizes;

(B) at least one reflection member for reflecting said image light emitted from said projector unit toward said screen;

(C) a housing for accommodating said projector unit and said reflection member, said housing being mounted with said screen; and (D) an opening for taking out said lamp, said opening being formed in said housing, said opening allowing said lamp unit to be taken out from said lamp housing to the outside of said housing.

2. A rear projection apparatus as claimed in claim 1, wherein said lamp of said lamp unit is supplied with power from said lamp housing when said lamp unit is set in said lamp housing.

3. A rear projection apparatus as claimed in claim 2, wherein said rear projection apparatus further includes a lid for closing said opening for taking out said lamp.

4. A rear projection apparatus as claimed in claim 3, wherein said lamp unit is formed with a handle.

5. A rear projection apparatus as claimed in claim 4, wherein said at least one image display panel is three liquid crystal display panels, and color images are displayed on said screen.

6. A rear projection apparatus for projecting image light from behind a screen, said rear projection apparatus comprising:

(A) a projector unit for emitting said image light, said projector unit comprising:

(a) at least one image display panel, said image display panel converting illumination light to said image light;

(b) a unit body for accommodating said image display panel;

(c) a lamp for emitting said illumination light;

(d) a lamp unit for accommodating said lamp, said lamp, unit having an optical axis;

(e) a lamp housing for removably holding said lamp unit;

(f) a connection mechanism for connecting said lamp housing to said unit body in a direction parallel to said screen and perpendicular to an optical axis of image light emitted from said projector unit, said connection mechanism fixing said lamp housing to said unit body in a state that maintains a predetermined posture of said lamp unit, other than in rotation about the optical axis of the lamp unit, relative to the projector unit as said unit body is rotated to different projection angles from the horizontal direction so as to accommodate different screen sizes;

(B) at least one reflection member for reflecting said image light emitted from said projector unit toward said screen;

(C) a housing for accommodating said projector unit and said reflection member, said housing being mounted with said screen; and (D) an opening for taking out said lamp, said opening being formed in said housing, said opening allowing said lamp unit to be taken out from said lamp housing to the outside of said housing;

said connection mechanism including:

a first flange being provided in said unit body, at least one first slit having an arc-shape, and said first slit being formed in said first flange;

a second flange being provided in said lamp housing, said second flange contacting said first flange;

at least one second slit having an arc-shape, said second slit being formed in said second flange; and a connection member for connecting said first flange and said second flange, said connection member being inserted in said first slit and said second slit.

* * * * *

UNITED STATES PATENT AND TRADEMARK OFFICE
CERTIFICATE OF CORRECTION

PATENT NO. : 7,329,010 B2
APPLICATION NO. : 11/048750
DATED : February 12, 2008
INVENTOR(S) : Kuroda It is certified that error appears in the above-identified patent and that said Letters Patent is hereby corrected as shown below:

The title page showing the illustrative figure should be deleted to be replaced with the attached title page.

The drawing sheets, consisting of Figs. 1-6B, should be deleted to be replaced with the drawing sheets, consisting of Figs. 1-6B, as shown on the attached page.

<u>Column 1</u>
Lines 24 and 44, change "size" to -- sizes --;
Line 48, change "prior art" to -- prior art devices --;

<u>Column 4</u>
Line 63, change "convening" to -- converting --;

<u>Column 6</u>
Line 5, change "lamp, unit" to -- lamp unit --.

Signed and Sealed this

Eighth Day of July, 2008

JON W. DUDAS
*Director of the United States Patent and Trademark Office*

United States Patent
Kuroda (10) Patent No.: US 7,329,010 B2
(45) Date of Patent: Feb. 12, 2008

(54) REAR PROJECTION APPARATUS

(75) Inventor: Yasuto Kuroda, Saitama (JP)

(73) Assignee: Fujinon Corporation, Saitama (JP)

( * ) Notice: Subject to any disclaimer, the term of this patent is extended or adjusted under 35 U.S.C. 154(b) by 235 days.

(21) Appl. No.: 11/048,750

(22) Filed: Feb. 3, 2005

(65) Prior Publication Data
US 2005/0174546 A1    Aug. 11, 2005

(30) Foreign Application Priority Data
Feb. 10, 2004  (JP) ............................ 2004-034036

(51) Int. Cl.
*G03B 21/20* (2006.01)
*H04N 5/64* (2006.01)

(52) U.S. Cl. ................ 353/87; 353/119; 348/794

(58) Field of Classification Search ............... 353/31, 353/69, 70, 72, 74, 77, 78, 79, 85, 87, 119, 353/75; 359/649, 703; 348/793, 787, 788, 348/789, 794; 312/10.1; 349/58; 321/20; *G03B 21/20*
See application file for complete search history.

(56) References Cited

U.S. PATENT DOCUMENTS

| | | | |
|---|---|---|---|
| 5,833,341 A * | 11/1998 | Kimura et al. | 353/98 |
| 6,224,216 B1 * | 5/2001 | Parker et al. | 353/31 |
| 6,467,913 B1 * | 10/2002 | Ueyama et al. | 353/87 |
| 6,508,556 B1 * | 1/2003 | Ueda | 353/74 |
| 6,547,423 B2 * | 4/2003 | Marshall et al. | 362/333 |
| 6,594,089 B2 * | 7/2003 | Tanabe | 359/703 |
| 6,712,486 B1 * | 3/2004 | Popovich et al. | 362/249 |
| 6,834,963 B2 * | 12/2004 | Kim et al. | 353/31 |
| 6,969,180 B2 * | 11/2005 | Waters | 362/293 |
| 7,048,389 B2 * | 5/2006 | Lee | 353/101 |
| 7,059,746 B2 * | 6/2006 | Takezawa | 362/252 |
| 7,088,321 B1 * | 8/2006 | Parker | 345/83 |
| 2004/0263790 A1* | 12/2004 | VanOverloop et al. | 353/31 |

FOREIGN PATENT DOCUMENTS

| | | |
|---|---|---|
| JP | 2000-112026 | 4/2000 |
| JP | 2001-264878 | 9/2001 |

* cited by examiner

*Primary Examiner*—Andrew T Sever
(74) *Attorney, Agent, or Firm*—Arnold International; Bruce Y. Arnold

(57) ABSTRACT

A housing is mounted with a screen. The housing accommodates a projector unit and a mirror. Image light emitted from the projector unit is projected to the rear of a translucent screen via the mirror. The projector unit includes a unit body, which accommodates liquid crystal display (LCD) panels and a projection lens, and a lamp housing in which a lamp unit is removably set. The lamp housing is rotatably attached to the unit body in a direction parallel to the screen and perpendicular to the unit body. The lamp housing is fixed to the unit body in a state that the lamp unit is set in a predetermined posture. The lamp unit is set in the lamp housing via a lamp opening of the housing.

6 Claims, 6 Drawing Sheets